Nov. 8, 1932.  B. HALL  1,887,127
REFRIGERATING APPARATUS
Filed Nov. 6, 1929  3 Sheets-Sheet 1

INVENTOR
Bicknell Hall.
by H.W. Hemingway, Atty

Nov. 8, 1932. B. HALL 1,887,127
REFRIGERATING APPARATUS
Filed Nov. 6, 1929   3 Sheets-Sheet 3

INVENTOR
Bicknell Hall.
by H. W. Hemenway, Atty

Patented Nov. 8, 1932

1,887,127

UNITED STATES PATENT OFFICE

BICKNELL HALL, OF GLOUCESTER, MASSACHUSETTS, ASSIGNOR TO FROSTED FOODS COMPANY, INC., OF DOVER, DELAWARE, A CORPORATION OF DELAWARE

REFRIGERATING APPARATUS

Application filed November 6, 1929. Serial No. 405,249.

This invention relates to refrigerating apparatus adapted for freezing, quick-freezing or chilling food products to any desired degree of congealation.

Food products may be quick-frozen to good advantage between heat-conductive members which engage the product upon opposite sides over a substantial area thereof and establish intimate contact, insuring uniform and rapid interchange of heat between the product and the heat-conductive members. In such apparatus it is important that the unfrozen product should be engaged with a measured degree of pressure adjusted to the requirements of the work in hand so that, on the one hand, the shape of the product in its package or container may be maintained without distortion, but on the other hand, the pressure is sufficient to cause the expansion of the product in freezing to take place internally, closing the voids in the product and thus solidifying and compacting the mass thereof. It is also important to supply an ample quantity of refrigerating medium to the heat-conductive members in order to maintain a pronounced temperature difference between the product and the surfaces engaging it and thus insure a rapid heat interchange.

The present invention contemplates refrigerating apparatus having these desirable qualities and being also so constructed as to facilitate a continuous mode of operation in accordance with which, if desired, the product may be automatically presented to and delivered from the apparatus. I also contemplate apparatus of large refrigerating capacity so designed as to occupy a relatively small amount of floor space and being, therefore, adapted for installation in plants of medium size or in any location where limited areas are available.

In one aspect my invention consists in apparatus characterized by heat-conductive members relatively movable to engage between them a product to be chilled and then movable with the product to carry the same through an endless path, in which the product is subjected to refrigeration for a predetermined interval of time and then returned to be discharged at substantially the same location in which it was delivered to the heat-conductive members. Apparatus of the character above outlined possesses the advantages above discussed and others which will appear hereinafter. For example, by employing rotary heat-conductive plates, as in a preferred embodiment of the invention, a compact and efficient mechanical organization is secured in which an ample supply of refrigerating medium may be utilized throughout the freezing or chilling operation. Moreover, in such construction uniform refrigerating conditions are insured throughout the area of the heat-conductive plates, as the refrigerating medium may be introduced to the apparatus in the vicinity of the axis of rotation of the plates and distributed by radial passages of equal length.

As herein shown, the heat-conductive members are arranged to be automatically and periodically moved toward and from each other, thus affording an opportunity for delivering or discharging the product at recurring intervals in the cycle of the machine. The advantages of such construction as contributing to the organization of an automatically and continuously operating refrigerating apparatus will be apparent, and it is believed such construction has not heretofore been available.

In another aspect my invention consists broadly in combining refrigerated heat-conductive members adapted to engage and press between them an interposed product, with automatic feeding mechanism for successively presenting and removing units of the product. By such construction I have made available a unitary apparatus of substantially capacity requiring the minimum of attention and operating expense.

These and other features of the invention will be best understood and appreciated from the following description of a preferred embodiment thereof, selected for purposes of illustration and shown in the accompanying drawings, in which Fig. 1 is a view of the apparatus in vertical section;

Figure 1:
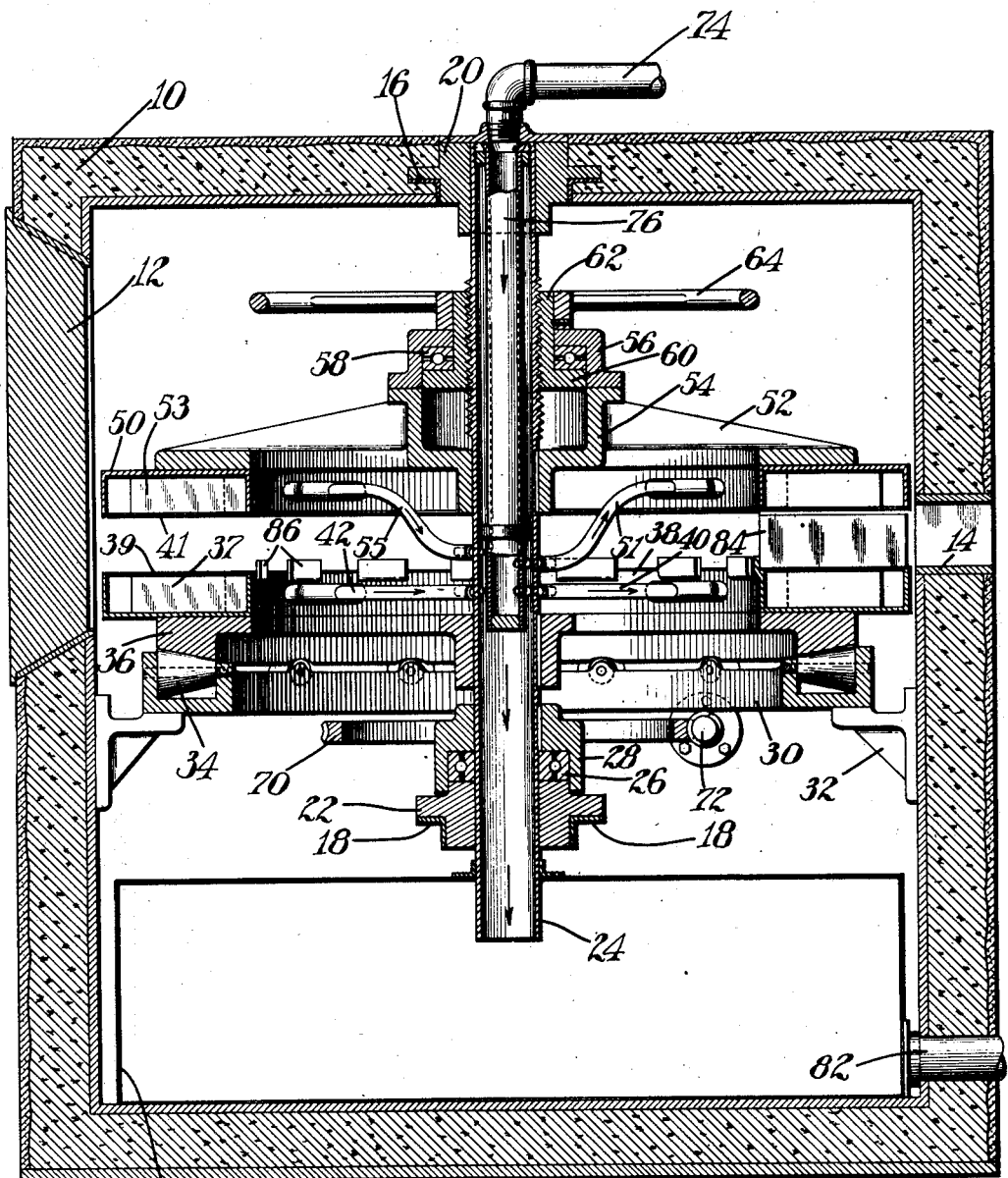

For purposes of illustration I have shown the apparatus as enclosed in an insulated chamber 10, the walls of which comprise outer and inner casings filled with ground cork or other heat insulating material. The chamber is provided at one side with a door 12 and at the opposite side with an opening 14 through which the product is delivered to and discharged from the apparatus. The insulated chamber is otherwise imperforate except for the pipe connections for the refrigerating medium, which will be presently described. The character of the insulating enclosure is of secondary importance only, although for economy of refrigeration it is desirable to install the apparatus under conditions which will reduce heat loss to a minimum.

The heat-conductive members herein shown comprise a pair of flat annular rings mounted to rotate about a vertical axis and with the work-supporting face of the lower plate substantially in the plane of the opening 14. The spindle to which the heat-conductive plates are secured and with which they turn comprises a hollow shaft 24 having an upper stationary bearing 20 supported upon transverse angle irons 16 in the upper side of the heat insulated chamber, and a lower bearing 22 supported by angle irons 18 which extend across the chamber from side to side. The hollow shaft 24 turns in the vertical bearings 20 and 22 and is provided above the lower bearing with ball bearings 26 enclosed by a cap 28 keyed to the hollow shaft 24.

A horizontal annular supporting ring 30 is mounted within the insulated chamber upon brackets 32. It is provided with upstanding flanges between which is journaled a series of conical rollers 34 arranged with their axes disposed in radial relation to the axis of the hollow shaft 24. Resting upon the rollers 34 of the stationary supporting ring 30 is a carrier ring 36 which is keyed to the shaft 24 and arranged for a limited vertical movement thereon. The lower face of the carrier ring 36 is inclined to correspond to the angle of the rollers 34 and is provided with a series of curved pockets spaced to correspond in position to the rollers 34. Accordingly, when the shaft 24 is rotated with the carrier ring 36, the latter is lifted whenever the pockets in its lower surface are moved circumferentially out of register with the rollers 34 and dropped a corresponding distance every time the pockets are turned into registration with the rollers. If, for example, there are 16 pockets in the carrier ring 36, it will be raised and lowered 16 times in one revolution and its rotation will take place while it is maintained in its upper position with a portion of its lower face between the pockets resting upon the rollers 34.

Figure 2:
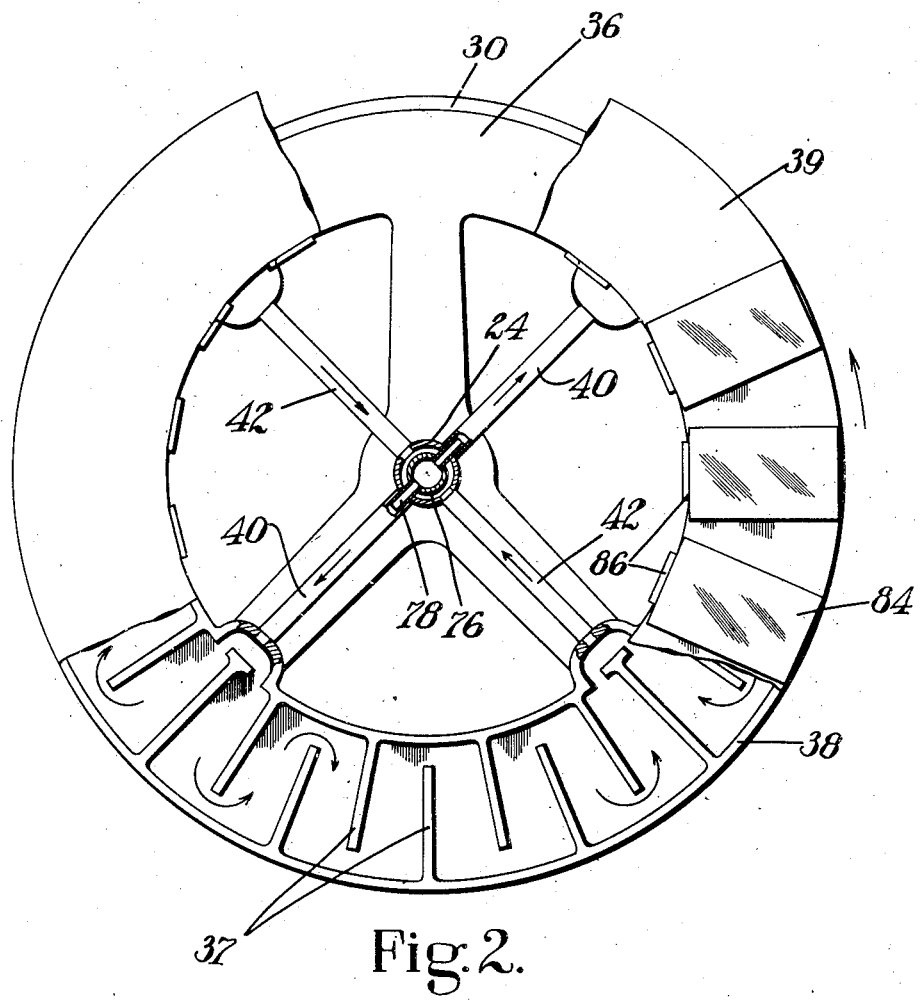
Fig. 2 is a plan view of one of the heat-conductive members, partially in section.

The carrier ring 36 supports and carries the lower heat-conductive ring 38 which, as shown in Fig. 2, comprises a hollow ring casting with a thin sheet metal facing 39. The ring casting is provided with baffle ribs 37 projecting in opposite directions from the inner and outer flanges of the ring, thus forming a sinuous circumferential passage in the ring. Flexible supply connections 40 extend radially to the ring at diametrically opposite points and similar discharge connections 42 extend diametrically from the ring at points displaced 90° circumferentially. It will be understood that the lower heat-conductive ring 38 rests upon the surface of the carrier ring, being supported at all times by the latter and rotated when the carrier ring is rotated by the shaft 24.

The upper heat-conductive ring 50 is similar in construction and dimensions to the lower heat-conductive ring but is reversed in position so that its thin sheet metal face 41 is directed downwardly. The ring 50 is rigidly secured to a carrier member 52, having a circumferential flange and spokes which connect the flange to a hub 54 keyed to the hollow shaft 24 and arranged for vertical adjusting movement thereon. To this end, the hub 54 is provided with a cap 56 having an inwardly extending flange arranged to overlie ball thrust bearings 58 which are supported by the outstanding flange 60 of a sleeve 62 threaded upon the shaft 24 and pinned to a hand wheel 64. It will be apparent that by turning the hand wheel 64 the sleeve 62 may be raised or lowered upon the shaft, and through the bearings 58 and the cap 56 the carrier member 52 and its connected ring 50 may be vertically adjusted. The hollow shaft 24 is rotated slowly and uniformly by means of a worm gear 70 secured to or forming a part of the cap 28 and disposed below the plane of the stationary supporting ring 30. The worm gear 70 is arranged to mesh with a horizontal worm shaft 72 journaled in suitable bearings and extending outside the insulated chamber 10 to a motor (not shown) or other suitable source of power.

The heat-conductive rings 38 and 50 may be refrigerated by any desired refrigerating medium, such as calcium chloride brine, or by the direct expansion of a liquefied gas, such as carbon dioxide. The apparatus herein shown, however, is particularly well adapted for use with calcium chloride brine maintained at an average temperature of 45° below zero F. This may be supplied by a pipe 74 leading through the upper side of the insulating chamber 10 and communicating with a vertical supply pipe 76 disposed concentrically within the hollow shaft 24 and maintained in position therein by spacing collars. The vertical pipe 76 extends to a position below the plane of the lower ring 38, where it is plugged. It is perforated near its lower end in four places for the reception of nipples 78 which extend outwardly through the walls of the hollow shaft 24, where they are connected with two flexible pipes 40 leading to the lower ring 38 and two flexible pipes 51 leading to the upper ring 50. The flexible supply pipes 40 and 51, as already explained, are preferably arranged to communicate with the rings at diametrically opposite points so that the refrigerating medium may flow 90° in each direction through the sinuous passages formed by the baffle ribs 37 in the lower plate and similar baffle ribs 53 in the upper ring. Flexible discharge pipes 42 lead from the lower ring at points midway between the supply pipes 40 back to the hollow shaft 24, so that fresh brine supplied by the pipe 76 and the flexible pipes 40 is discharged from the ring through the flexible pipes 42 to the annular space between the pipe 76 and the hollow shaft 24. Similarly, brine supplied to the upper ring by the pipe 76 and the flexible supply pipes 51 is discharged after passing through the ring through the medium of a pair of diametrically arranged flexible pipes 55. At its lower end the hollow shaft 24 extends into a tank or reservoir 80 arranged in the bottom of the insulated chamber 10 and provided with a discharge pipe 82 by which it may be led back to a refrigerating machine of any commercial type, to be chilled and recirculated.

It will be apparent from the foregoing description that provision has been made for a continuous circulation of brine in ample quantity through the heat-conductive rings 38 and 50 in all positions of the latter, regardless of rotation or vertical adjustment. The hollow shaft 24 and the concentrically arranged supply pipe 76 turn with the heat-conductive rings as a unit and the vertical movement of the rings with respect to the hollow shaft 24 is provided for by the flexible radially-disposed pipes which extend from the shaft to the rings.

The apparatus herein shown may be used with advantage for refrigerating food products of various character, but it is particularly well adapted for handling food products packaged in rectangular cartons. Such a food package 84 is shown in Fig. 1 as having been induced in position upon the surface of the lower ring 38 through the opening 14. For the purpose of properly locating such cartons, the lower ring is provided with a series of gauge plates 86 which project upwardly from its inner cylindrical surface a sufficient height above its upper face to engage and locate cartons presented through the opening 14. In Fig. 1, the lower ring 38 is shown as occupying its lowermost position, the pockets in the carrier ring 36 registering with the rollers 34. The space between the two rings, therefore, is greater than the thickness of the carton. When, however, the carrier ring is turned so that its flat lower face rides up upon the rolls 34, the lower ring will be elevated sufficiently to bring the upper face of the carton 84 into engagement with the lower face of the upper ring 50. The degree of pressure exerted on the carton in this movement will depend upon the vertical position of the upper ring as determined by the hand wheel 64.

Figure 3:
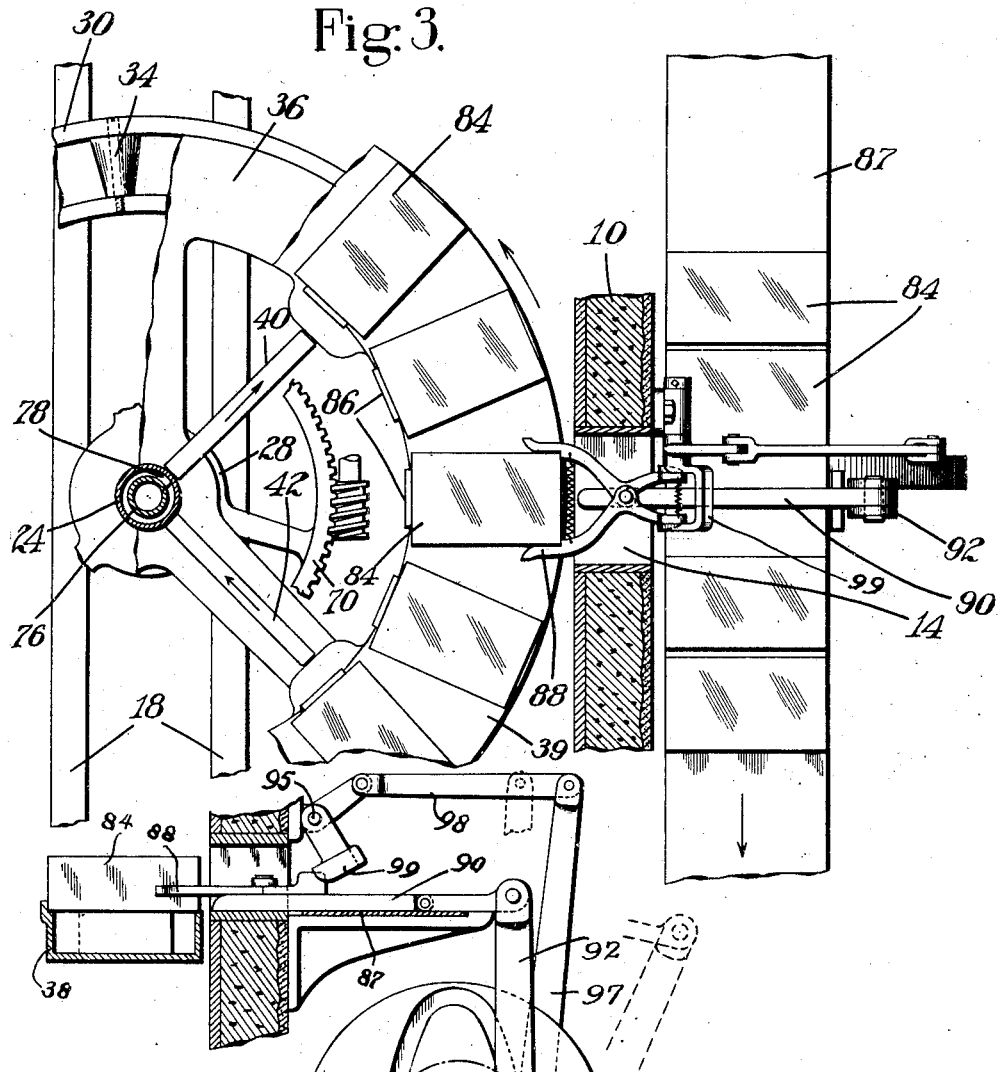
Fig. 3 is a fragmentary plan view of one of the heat-conductive members and the feeding mechanism.
Figure 4:
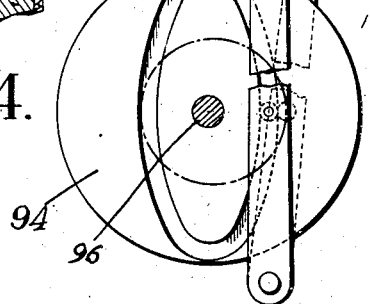
Fig. 4 is a similar view in end elevation, partly in section.

It will be apparent that cartons or other product may be supplied to the apparatus by hand, although additional advantages of economy are derived from the employment of automatic feeding mechanism such as that illustrated in Figs. 3 and 4. Referring particularly to these figures, a conveyor belt 87 is arranged for movement adjacent to the opening 14 of the insulated chamber 10 and is arranged to move intermittently in presenting successively a series of cartons 84 in position opposite to the opening. A pair of feeding jaws 88 is mounted upon a slide 90 guided for movement in a path extending across the face of the conveyor 86. The end of each jaw 88 is flared and the two are yieldingly urged toward each other to facilitate engagement with the adjacent corners of a carton presented in line with the movement of the slide 90. The slide 90 is operated by a forked cam lever 92, having an intermediate roller which runs in a cam track formed in a cam disk 94 driven at the proper speed to insure the presentation of a carton to the heat-conductive rings while these are separated by the lowering of the lower ring. A yoke 99, pivotally mounted at 95 upon the casing and oscillated through a link 98 by a second cam lever 97, acts to pinch together the rear ends of the jaws 88 and open the jaws at the proper time.

For convenience, the usual manner of operating the apparatus above described will now be summarized. Cold brine is delivered continuously through the pipe 74 to the vertical supply pipe 76, from which it passes out radially through the two sets of flexible pipes 40 and 51 to the opposite sides of the upper and lower heat-conductive rings. The brine flows circumferentially in opposite directions through the sinuous passages of the rings and is returned to the hollow shaft 24 through the two sets of flexible pipes 42 and 55. The brine leaving the shaft 24 is collected in the reservoir 80, from which it is passed to a refrigerating machine to be refrigerated and recirculated. The hollow shaft is set in rotation by the worm shaft 72, carrying with it the carrier ring 36 supporting the lower heat-conductive ring 38 and the carrier member 52 to which the upper heat-conductive ring 50 is secured. The vertical position of the upper heat-conductive ring is determined in accordance with the thickness of the product to be refrigerated by turning the hand wheel 64. Assuming that the rollers 34 register with the pockets in the supporting ring 36, the space between the two heat-conductive rings 38 and 50 will be sufficient to permit the free introduction of food product packaged in cartons 84 through the opening 14. The feed slide 90 is timed to advance while the lower ring 38 is in its lowermost position and to deliver a carton 84 from the conveyor belt 87 into position upon the surface of the lower ring and in contact with the gauge plate 86 and then to withdraw, leaving the carton in position. The pockets in the lower surface of the carrier ring 36 being slightly wider than the rollers 34 permit the carrier ring 36 and the lower heat-conductive ring 38 to remain in lowered position for an interval of time sufficient to permit the required movements of the feed slide 90. When the carton has been properly delivered, further rotation of the shaft 24 with its assembly lifts the lower plate sufficiently to press the upper surface of the carton 84 against the lower face of the upper heat-conductive ring 50 and as the rotation of the rings continues the carton is maintained engaged and pressed between the two heat conductive rings, so that it is rapidly and uniformly chilled simultaneously from both surfaces. The rotation of the plates continues until the pockets are again brought into registration with the rollers of the supporting ring, whereupon the lower ring is again dropped and the feed slide 90 acts to engage and withdraw from between the heat-conductive rings a carton which has been carried by the rings through one complete rotation, and back again to the point of delivery. Meanwhile, the conveyor 87 advances another step, bringing an unfrozen carton into position for delivery and advancing the frozen carton out of range of the feed slide. The operation may continue continuously and indefinitely so long as fresh cartons of unfrozen product are supplied by the conveyor 87, and it will be apparent that each carton is automatically delivered to the heat-conductive plates firmly engaged between them, carried through the circular endless path of their rotation, and automatically discharged to the conveyor in frozen or chilled condition.

Having thus described my invention, what I claim as new and desire to secure by Letters Patent of the United States is:

1. Refrigerating apparatus comprising heat-conductive members relatively movable to engage between them a product to be chilled and then movable with the product to carry the same through an endless path, whereby the product may be delivered to and removed from the heat-conductive members in substantially the same location.

2. Refrigerating apparatus comprising heat-conductive members arranged to receive between them a product to be chilled and movable to carry the product through an endless path, thereby refrigerating it for a predetermined interval of time.

3. Refrigerating apparatus comprising flat heat-conductive members movable vertically first to engage between them a product to be chilled and then to disengage the chilled product, and means for transversely moving said members with the product between them to carry the latter through an endless path between the location at which it is engaged and disengaged.

4. Refrigerating apparatus comprising heat-conductive plates mounted to rotate about a vertical axis and arranged to carry between them a product to be chilled, and means for intermittently and relatively moving said plates to permit the presentation and removal of the product.

5. Refrigerating apparatus comprising heat-conductive plates mounted to rotate about a vertical axis and arranged to carry between them a product to be chilled, means for delivering a refrigerating medium to said plates throughout their rotation, and means for separating the plates periodically to receive the product.

6. Refrigerating apparatus comprising hollow heat-conductive plates mounted to rotate about a common axis with a product to be chilled held between them, means for circulating a liquid refrigerating medium through the plates during their rotation, and means for separating the plates when it is desired to introduce the product.

7. Refrigerating apparatus comprising spaced heat-conductive plates relatively movable in parallel relation, means for moving the plates together to engage and press interposed products, means for rotating said plates with the product so pressed and for automatically separating said plates to permit the removal of the chilled products.

8. Refrigerating apparatus comprising heat-conductive plates arranged to engage and press between them a product to be chilled, means for periodically moving one of said plates toward and from the other through a predetermined distance, and means for adjustably determining the position of the other plate.

9. Refrigerating apparatus comprising cooperating heat-conductive plates arranged to engage between them a product to be chilled, means for simultaneously rotating the plates about a common axis with the product pressed between them, and means for supplying a refrigerating medium to the plates from said common axis.

10. Refrigerating apparatus comprising an upper heat-conductive plate having a horizontally disposed face, a lower heat-conductive plate located beneath the first and arranged to receive and support the product to be chilled, and means for elevating said lower plate with the product thereon to press it against the face of the upper plate.

11. A heat-conductive member for refrigerating apparatus, comprising an annular ring having a flat product-supporting face and a circumferentially disposed chamber for refrigerating medium.

12. A heat-conductive member for refrigerating apparatus, comprising a plate having a circular boundary, a flat product-supporting face, a substantially coextensive chamber for refrigerating medium, and radially disposed passages communicating with said chamber.

13. Refrigerating apparatus comprising hollow heater-conductive plates arranged in vertical alignment to engage between them a series of product units disposed about the edge of the plates, each plate having a substantially centrally disposed opening, and connections located in said openings for supplying refrigerating medium to the plates.

14. Refrigerating apparatus comprising hollow heat-conductive plates arranged to be rotated about a common axis and having flat concentric product-engaging faces, and connections located at said axis for supplying refrigerating medium to said plates.

15. Refrigerating apparatus comprising a hollow shaft, annular heat-conductive rings carried thereby and having oppositely disposed product-engaging faces, and connections between said hollow shaft and said rings for supplying refrigerating medium to said rings.

16. Refrigerating apparatus comprising a vertical hollow shaft, means for rotating the same, a hollow heat-conductive plate arranged to be rotated by said shaft and supported independently thereof, a cooperating hollow heat-conductive plate arranged to be both rotated and supported by said shaft, and connections including said hollow shaft for circulating liquid refrigerating medium through said hollow plates during their rotation.

17. Refrigerating apparatus comprising heat-conductive plates arranged to engage between them a product to be chilled, in combination with automatic means for delivering successive product units in position between said plates.

18. Refrigerating apparatus comprising heat-conductive plates arranged to engage between them a plurality of product packages, in combination with automatic mechanism for delivering and discharging said packages to and from said plates so as to maintain a predetermined number of packages between the plates.

19. Refrigerating apparatus comprising heat-conductive plates movable relatively to engage and disengage product packages to be chilled and acting to maintain each package engaged for a predetermined interval, and automatic feeding mechanism for presenting successive packages to said heat-conductive plates in timed relation to their movement of engagement.

20. Refrigerating apparatus comprising heat-conductive plates movable automatically to engage and disengage product packages to be chilled and acting to maintain each package engaged for a predetermined interval, a conveyor for moving a series of packages along a path adjacent to said plates, and mechanical feeding means for transferring a package from the conveyor to said plates prior to each movement of engagement.

21. Refrigerating apparatus comprising heat conductive members relatively movable to engage between them with a predetermined pressure a product to be chilled and then movable with the product to carry the same through an endless path whereby the product may be delivered to and removed from the heat conductive members in substantially the same location, and means whereby the said pressure may be adjustably varied.

22. Refrigerating apparatus comprising heat conductive members, means for automatically feeding thereto a series of unfrozen product packages one after another, and means for engaging each package between the members with a predetermined pressure, the members being movable to carry each package through an endless path, thereby refrigerating it for a predetermined interval of time.

23. Refrigerating apparatus comprising heat conductive plates arranged to engage and press between them with a predetermined pressure a product to be chilled, means for periodically moving one of said plats toward and from the other through a predetermined distance, and means whereby the said pressure can be adjustably varied.

24. Refrigerating apparatus comprising two heat conductive members, one of said members being movable bodily as a unit away from and toward the other member to receive and engage between them a product to be chilled, the members being then movable with the product to carry the same through a refrigerating path, and means for cooling the members during such travel whereby the product is refrigerated.

25. Refrigerating apparatus comprising two rigid heat conductive members, means for causing movement of one of the members bodily away from and toward the other member to receive therebetween and engage with a predetermined pressure a product to be chilled, means for moving the members with the engaged product through a refrigerating path, and means for supplying a cooling fluid to the members during such travel whereby the product is refrigerated.

26. Refrigerating apparatus comprising two heat conductive members having cooling fluid-containing chambers within the adjacent faces thereof, means for causing a relative movement of the members to receive therebetween and engage with a predetermined pressure against the said faces a product to be chilled, means for moving the members with the engaged product through a refrigerating path, and means for supplying a cooling fluid to the chambers during such travel whereby the product is refrigerated.

27. Refrigerating apparatus comprising horizontally disposed refrigerating members arranged for rotation about a vertical axis, a shaft located at the rotary axis of said members and having a driving connection therewith, means for supporting the weight of the lower member independently of the shaft, and means for supplying a refrigerating medium to said member.

28. Refrigerating apparatus comprising cooperating rotatable refrigerating plates, a driving shaft therefor located at the axis of rotation of said plates, means for supporting the lower plate at a predetermined height, an adjustable connection between the shaft and the upper plate, whereby the height of the latter may be changed, and means for supplying a refrigerating medium to the plates.

29. Refrigerating apparatus including upper and lower plates rotatable about a common axis, a shaft located in said axis and carrying a vertically adjustable bearing upon which the upper plate is suspended, driving connections between the shaft and said upper plate, and means for raising or lowering said bearing on the shaft without interrupting said driving connection to said plate.

30. An apparatus for freezing packaged goods, including a pair of annular coaxially spaced relatively movable refrigerated conveyors adapted to receive the packages therebetween.

31. An apparatus for freezing packaged goods, including a pair of annular coaxially spaced refrigerated conveyors adapted to receive the packages therebetween and relatively movable axially to hold or release the packages disposed therebetween.

32. An apparatus for freezing packaged goods, including a pair of annular coaxially spaced refrigerated conveyors adapted to receive the packages therebetween, and means for effecting relatively axial movement of the conveyors at one part of the path of annular movement.

33. An apparatus for freezing packaged goods, including a pair of movable hollow spaced refrigerated conveyors adapted to receive the packages therebetween, and means for circulating a refrigerant through said conveyors in parallelism.

34. An apparatus for freezing packaged goods, including a pair of annular coaxially spaced refrigerated conveyors adapted to receive the packages therebetween, a central shaft, and means for permitting relative axial movement of said conveyors in respect to said shaft and preventing relative rotational movement.

35. An apparatus for freezing packaged goods, including a pair of annular coaxial conveyors presenting spaced walls adapted to receive the packages therebetween, a hollow rotatable shaft coaxial with said conveyors, and means for delivering refrigerant to refrigerate the outer surfaces of said walls.

36. An apparatus for freezing packaged goods, including a shaft, a pair of annular coaxial conveyors carried thereby and spaced apart axially to receive the packaged goods therebetween, said conveyors and said shaft having passages for the circulation of refrigerant therethrough, and separate connections between said shaft and each of said conveyors for delivering the refrigerant to and from the latter.

37. Refrigerating apparatus comprising cooperating horizontally-disposed heat-conductive plates having opposed refrigerated surfaces adapted to engage between them a product to be frozen, said plates being mounted for rotation about a central vertical axis with the product engaged between their refrigerated surfaces, and one plate being relatively movable in a vertical direction with respect to the other to engage or disengage the interposed product.

BICKNELL HALL.